Patented Aug. 15, 1944

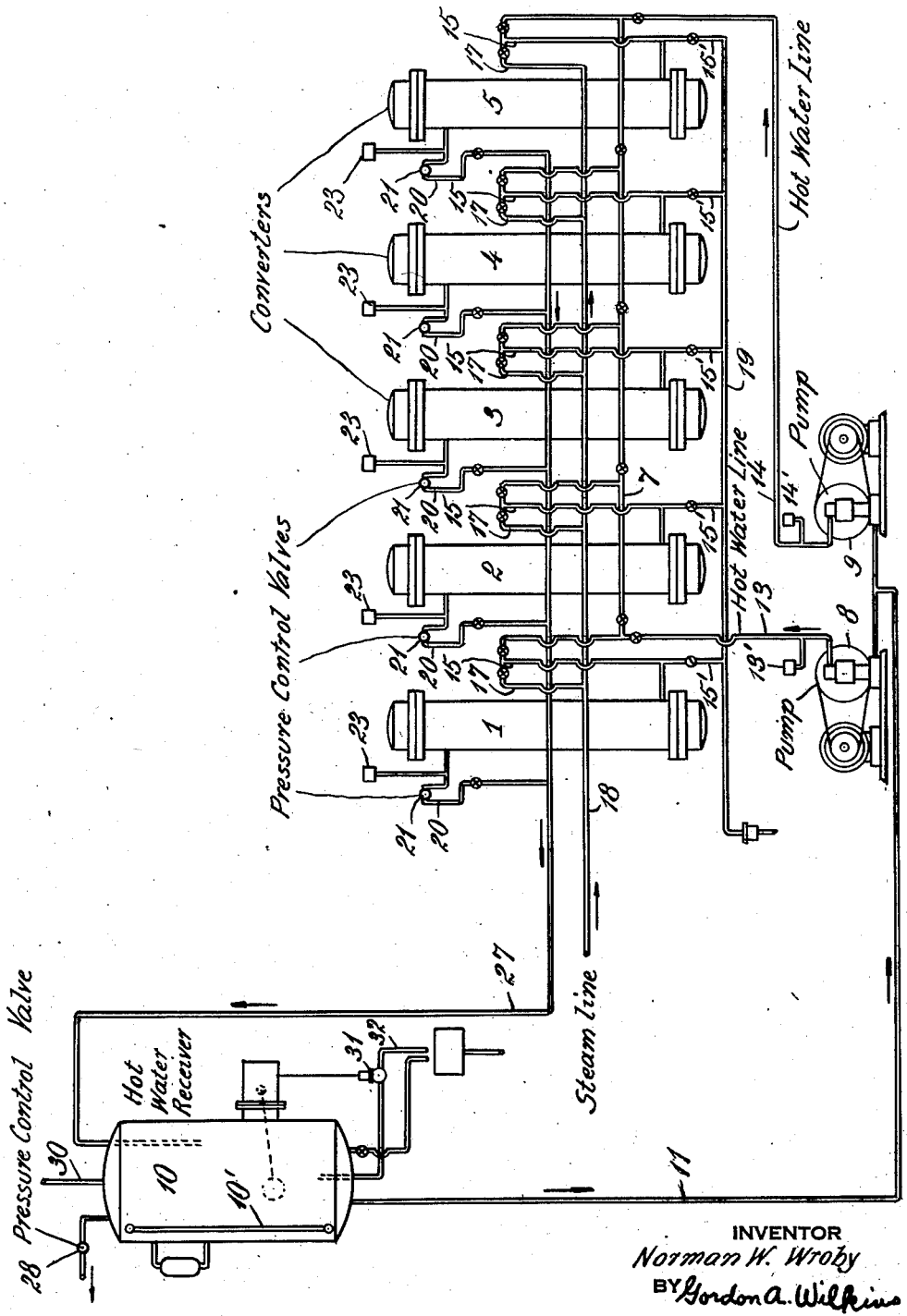

2,355,938

UNITED STATES PATENT OFFICE 2,355,938

TEMPERATURE CONTROL OF CATALYTIC CONVERTERS

Norman William Wroby, Tenafly, N. J., assignor, by mesne assignments, to Allied Chemical & Dye Corporation, a corporation of New York Application August 2, 1940, Serial No. 349,823

2 Claims. (Cl. 23—1)

This invention relates to temperature control of exothermic reactions and more particularly vapor phase catalytic exothermic reactions carried out within the range of 150° to 300° C.

Many exothermic catalytic reactions, such as the vapor phase hydrogenation of tar acids, hydrocarbons, e. g., benzene and its homologues, etc., are effected by passing the reactants through converters containing catalysts at temperatures of from 150° to 300° C. Such reactions require the rapid removal of large amounts of heat from the converters and close control of the temperature conditions in the reaction zone in order to avoid development of hot spots, which result in excessive catalyst deterioration and in objectionable side reactions with consequent formation of undesirable products. Furthermore, it is frequently desirable to maintain different temperatures within different portions of the reaction zone and as the catalyst loses activity during use it is necessary to vary the temperature in the reaction zone to accomplish conversion of the reactants at the desired rates.

The problem of controlling the temperature of catalytic converters has received much consideration by investigators in the vapor phase catalytic reaction field and many proposals have been made to control the temperatures within the converted tubes by surrounding the tubes with a heat exchange medium. For example, there is the valuable contribution of Downs Patent No. 1,604,739 disclosing the use of a boiling bath of mercury for controling the temperatures of catalytic reactions carried out at temperatures of from about 250° C. to around 600° C. Boiling baths of sulfur have also been suggested for controlling converter temperatures. Boiling baths of mercury and sulfur may be utilized only for controlling reactions carried out at relatively high temperatures. Moreover, the use of sulfur is objectionable because it attacks most metals at high temperatures. It has also been proposed to locate converter tubes in a high pressure steam boiler containing a stationary body of water surrounding the lower portions of the tubes and steam surrounding the upper portions of the tubes above the water level, the boiler being maintained at about the pressure corresponding to the temperature desired in the converter tubes. The hot converter tubes cause the water in the lower portion of the boiler to boil and heat is removed by permitting steam under pressure to escape from the boiler. This proposal is open to the serious objection that dry steam has a lower heat transfer capacity than water so that heat is removed more rapidly from the lower than from the upper portions of the converter tubes, resulting in non-uniform temperatures in the tubes. Furthermore, dry steam surrounding the upper portions of the tubes picks up heat from the tubes and this causes superheating of the steam and consequent increase of temperature of the tube walls in contact with the steam. These disadvantages render it difficult to effect close control of the converter temperatures and promote development of hot spots in the catalyst with consequent formation of undesirable reaction products and excessive catalyst deterioration.

It is an object of this invention to provide a novel process for the temperature control of exothermic reactions carried out at temperatures of from 150° to 300° C.

It is a further object of the invention to provide an improved process and apparatus for controlling the temperature of exothermic reactions carried out within the range of 150° to 300° C., utilizing water as the temperature control medium. Other objects and advantages will appear hereinafter.

In accordance with the invention, catalytic converters for carrying out exothermic reactions effected within the range of 150° to 300° C. are maintained at the desired temperature by continuously flowing a body of boiling water under a gauge pressure of 25 to 350 pounds per square inch into contact with substantially the entire exterior extent of the converter walls while maintaining a rate of flow on a weight basis such that at least twice as much water is passed over the converter walls as is transformed into steam by heat therefrom and preventing the formation of a substantial body of dry steam in contact with the walls. Preferably not more than ten times as much water is passed over the converter walls as is converted into steam by heat from the walls. The pressure employed is such that the water boils at the temperature at which it is desired to maintain the exterior of the converter walls, e. g., to maintain a converter exterior wall temperature of 200° C. the water is maintained under a gauge pressure of about 210 pounds per square inch. Ordinarily, particularly in highly exothermic reactions, the temperature of the catalyst within the converter is somewhat higher than the exterior wall temperature of the converter. Preferably, the water is raised to a temperature in the neighborhood of the boiling point at the pressure employed by mixing it with steam prior to passage of the water into contact with the converter walls, although, if desired, the temperature may be raised to boiling shortly after contacting the walls.

The invention may advantageously be carried out in apparatus involving one or more water jacketed reaction tubes or converters having a water inlet at one end and an outlet equipped with an adjustable pressure control valve that will pass a mixture of steam and water at the other end and a pump for forcing water at the desired pressure and rate of flow through the jackets. Steam may be flashed from the boiling water after it leaves the converter jacket into a flash tank system and the hot water recirculated therefrom through the jacket by the pump or the boiling water may be discarded. Where the reaction is such that it is advantageous to maintain different temperature conditions at different stages of the reaction, it may be carried out in a plurality of converters connected in a train and two or more pumps employed for forcing water under different pressures through the water jackets of the different converters, e. g., if five converters are employed and it is desired to maintain a higher temperature in the first three converters than in the last two, one pump may be utilized to effect flow of water through the jackets of the first three converters at the desired pressure and the other pump employed to force water at a lower pressure through the jackets of the other two converters. Furthermore, in any group of converters, the jackets of which are supplied by one pump, small variations in the rate of heat liberation in the various converters owing to differences in catalyst activity and the like may be compensated for by independently varying the pressure in the individual converter jackets.

I have found that by continuously flowing a body of boiling water under a gauge pressure of 25 to 350 pounds per square inch through the jackets of converter tubes for carrying out exothermic reactions within the range of 150° to 300° C., and in such a way as to maintain the jackets completely full of boiling water under the pressure mentioned, remarkably accurate control of the temperature within narrow limits to obtain optimum results may readily be effected. This may be attributed to the fact that boiling water is a highly efficient heat transfer medium and that by maintaining continuous flow of at least twice as much water as is converted into steam over the converter walls and by preventing contact of the walls with a substantial body of dry steam, the temperature of the entire wall surface is maintained constant. Furthermore, flow of the water promotes wetting of the tube walls and aids sweeping away accumulations of steam bubbles on the converter walls which otherwise might impede heat transfer and so build up local hot spots.

As hereinabove mentioned, the invention is suitable for effecting temperature control of exothermic reactions carried out within the range of from 150° to 300° C. and is particularly suitable for controlling the temperature of exothermic vapor phase catalytic reactions which take place within this temperature range; this invention, it has been found, permits the maintenance of constant temperatures, e. g., less than about 5° C. variation from a desired operating temperature for long periods of time, e. g., days or longer. Among such reactions may be mentioned the vapor phase hydrogenation of phenol to produce cyclohexanol; vapor phase hydrogenation of cresols to produce methylcyclohexanols; and hydrogenation of benzene and its homologues such as toluene and xylene to produce cyclohexane and methylcyclohexanes. For effecting hydrogenation of these materials, hydrogenation catalyst, such as nickel catalyst, is maintained in the catalytic converters.

For a more complete understanding of the invention, reference should be had to the accompanying drawing showing for purposes of exemplification a diagrammatic elevational view of a preferred embodiment of the invention suitable for carrying out exothermic vapor phase catalytic reactions such as the vapor phase hydrogenation of tar acids, benzenoid hydrocarbons and the like.

In the drawing reference numerals 1, 2, 3, 4, and 5 designate a series of catalytic tubes or converters, each surrounded by a water jacket and its reaction mass discharging at its bottom and passing into the top of the succeeding converter of the series by suitable connections (not shown). A vaporized reactant, such as a tar acid, benzene, etc., to be hydrogenated is mixed with hydrogen prior to introduction into the converters.

Reference numerals 8 and 9 designate pumps for withdrawing hot water from receiver 10, equipped with water gauge 10', through conduit 11 and forcing it under gauge pressures of 25 to 350 pounds per square inch through valved conduits 13 and 14, equipped with pressure gauges 13' and 14', to the inlet conduits 15 communicating with the bottoms of the water jackets of the converters. Conduits 13 and 14 are connected by valved header 7 so that by manipulation of the valves in the header and in the conduits 13 and 14, water from either of the pumps may be introduced into the jackets of all of the converters or one pump may be utilized to force water into any number of the converters.

Each of the water inlet conduits 15 is equipped with a valved steam conduit 17 communicating with steam supply line 18 so that by operation of the valves steam may be mixed with the water from the pumps to bring it to boiling temperature prior to introduction in the water jackets. Inlet conduits 15 are also provided with valved drain conduits 15' discharging into drain header 19 so that water may be drained from the jackets when desired. The water jackets are equipped at their upper ends with water and steam outlet conduits 20 provided with pressure-control valves 21 which automatically permit the escape of steam and water when the pressure in the conduits exceeds that for which the valves are set. Reference numerals 23 designate pressure gauges. Each of the water jackets is provided with a safety valve (not shown). The water jacket outlets 20 discharge into conduit 27 which in turn discharges into hot water receiver 10. Steam flashes from the boiling water upon passing the pressure-control valves 21, is separated from the hot water in receiver 10, and escapes through pressure-control valve 28 which may be set to maintain any desired pressure within the hot water receiver 10. Water may be introduced into the receiver 10 from time to time as required through inlet 30. Float operated valve 31 opens drain 32 in case the water level in the receiver rises above the desired level.

In operation, if it is desired to carry out an exothermic reaction such as hydrogenation at a temperature of 220° C. liberating heat in the amount of about 1 million B. t. u. per hour in each of converter tubes 1, 2 and 3 and about 100,000 B. t. u. per hour in each of converter tubes 4 and 5, hot water under gauge pressure of about 50 pounds per square inch from receiver 10 is pumped by pump 8 through conduit 13 under gauge pressure of 150 pounds per square inch and passed through each of the jackets of converters 1, 2, and 3 at a rate of about 3,000 pounds per hour. Sufficient steam is admitted through conduits 17 to raise the temperature of the water to about 185° C., i. e., its boiling point at the pressure employed, as it enters the jackets. Water is similarly forced by pump 9 under gauge pressure of 200 pounds per square inch at a rate of 500 pounds per hour through each of the jackets of converters 4 and 5, steam being added through steam inlets 17 to raise the water to boiling temperature as it enters the jackets. The pressure-control valves 21 of converters 1, 2, and 3 are adjusted to open and permit passage of steam and water from the converter jackets when the gauge pressure exceeds 150 pounds per square inch and the pressure-control valves of converters 4 and 5 are adjusted to open when the gauge pressure exceeds 200 pounds per square inch. Continuous flow of water is maintained through all of the converters, about 40 per cent of the water being converted into steam and passing through the pressure-control valves in admixture with water. Water and steam discharged through the converter jacket outlets are returned through conduit 27 to receiver 10 where the pressure is 50 pounds per square inch gauge and the separated water is recirculated through the converter jackets by pumps 8 and 9.

In some cases the reaction proceeds violently during passage of the reactants through the initial portion of the converters so that the major portion of the heat of reaction is liberated before the reactants reach the neighborhood of the outlet of the reaction zone. In such cases it may be found that the reaction is thermally self-sustaining in the neighborhood of the outlet of the reaction zone and cooling is necessary only in the converters where the reaction is violent and liberates large quantities of heat. For example, in the hydrogenation of phenol involving passage of phenol vapors at the rate of 110 pounds per hour at a gauge pressure of 200 pounds per square inch mixed with about 1,000 cubic feet of hydrogen per hour measured at room temperature and at 200 pounds per square inch gauge through a train of five jacketed converter tubes 4" in diameter and 78" high, each containing two nickel screen cages 36" long and 3⅞" in diameter, filled with nickel hydrogenation catalyst, from 98 to 100 per cent of the phenol was converted to cyclohexanol. It was found that of the total 110,000 B. t. u. per hour liberated, 60,000 B. t. u. per hour were liberated in the second tube. The temperature at the middle of this tube was maintained at about 250° C. by pumping 100 gallons of water per hour under a gauge pressure of 100 pounds per square inch through the jacket of the tube, the water being heated to boiling temperature by mixing therewith a small amount of steam under 250 pounds pressure per square inch gauge prior to entry into the jacket. Less than 10 gallons of water was vaporized per hour to effect removal of 60,000 B. t. u. per hour. In the course of operation, owing to reduction of the activity of the catalyst in the second tube, the amount of heat liberated therein gradually dropped to about 40,000 B. t. u. per hour. To compensate for this reduction, the water pressure in the tube jacket was gradually increased to about 175 pounds per square inch gauge. Meanwhile, the amount of heat liberated in the third tube increased and in order to maintain this tube at the desired temperature the water pressure in its water jacket was decreased to effect more rapid removal of heat from the tube.

It will be observed that the temperature of the boiling water was below that of the catalyst in the converter tubes. The temperature difference between the catalyst and the water may vary for different reactions, catalysts and equipment, and depends on the tube surface, the rate of production of heat during the reaction and the rate of transfer of heat from the reactants within the converter to the converter walls.

Thus it will be seen that by continuously flowing a body of boiling water under a gauge pressure of from 25 to 350 pounds per square inch through the water jackets of converter tubes for carrying out exothermic reactions within the range of 150° to 300° C., the temperature within the tubes may be accurately maintained within optimum limits by regulating the rate of flow so that at least twice as much water is introduced into the jackets as is converted into steam therein. A flowing stream of water is maintained in contact with the entire exterior extent of the converter walls and is so regulated that the formation of a substantial body of dry steam which would impede heat transfer is avoided. The temperature of the various tubes of a converter train may be independently regulated to compensate for variations in the rate of heat liberation owing to variations in catalytic activity and the like.

Since certain changes may be made without departing from the scope of the invention, it is intended that the above shall be interpreted as illustrative and not in a limiting sense.

What is claimed is:

1. A process of maintaining different temperatures in different portions of an exothermic catalytic reaction zone involving a train of water-jacketed catalytic converters connected in series for flow of reactants therethrough, which process comprises pumping a stream of boiling water at a predetermined pressure within the range of 25 to 350 pounds per square inch through substantially the entire extent of the water jackets of some of said converters, pumping a stream of boiling water at a different predetermined pressure within the range of 25 to 350 pounds per square inch through substantially the entire extent of the jackets of other of said converters, preventing the pressures within the respective converters from rising above said predetermined pressures, whereby the heat liberated by said exothermic reaction is absorbed by vaporization of the boiling water, and regulating the flow of water through said jackets at a rate sufficiently high to prevent formation of a substantial body of steam in said jackets.

2. A process as defined in the preceding claim in which at least twice but not more than ten times as much water is introduced into said jackets as is converted into steam during passage therethrough.

NORMAN WILLIAM WROBY.